United States Patent
Naamneh et al.

(10) Patent No.: US 12,254,474 B1
(45) Date of Patent: Mar. 18, 2025

(54) SYSTEMS AND METHODS FOR ENFORCING STRICT NETWORK CONNECTIVITY AND STORAGE ACCESS DURING ONLINE PAYMENTS

(71) Applicant: GEN DIGITAL INC., Tempe, AZ (US)

(72) Inventors: Bahaa Naamneh, Oslo (NO); David Luz Silva, Dublin (IE); Iskander Sanchez Rola, Antibes (FR)

(73) Assignee: GEN DIGITAL INC., Tempe, AZ (US)

( * ) Notice: Subject to any disclaimer, the term of this patent is extended or adjusted under 35 U.S.C. 154(b) by 543 days.

(21) Appl. No.: 17/457,865

(22) Filed: Dec. 6, 2021

(51) Int. Cl.
*H04L 9/40* (2022.01)
*G06Q 20/40* (2012.01)

(52) U.S. Cl.
CPC ..... *G06Q 20/4016* (2013.01); *G06Q 20/4014* (2013.01); *G06Q 20/407* (2013.01); *H04L 63/1416* (2013.01); *H04L 63/1466* (2013.01)

(58) Field of Classification Search
CPC ........... G06Q 20/4016; G06Q 20/4014; G06Q 20/407; H04L 63/1416; H04L 63/1466
See application file for complete search history.

(56) References Cited

U.S. PATENT DOCUMENTS

| | | | |
|---|---|---|---|
| 8,789,178 B2 * | 7/2014 | Kejriwal | H04L 63/1416 726/22 |
| 11,089,055 B1 * | 8/2021 | Sadovyi | G06Q 20/085 |
| 2018/0198807 A1 * | 7/2018 | Johns | H04L 63/1425 |
| 2021/0176273 A1 * | 6/2021 | Hales | H04L 67/02 |
| 2021/0385245 A1 * | 12/2021 | Melson | H04L 63/1433 |
| 2022/0272123 A1 * | 8/2022 | McCracken | H04L 63/1466 |

OTHER PUBLICATIONS

Davenport, Corbin, "Chrome debuts Manifest V3 API for extensions, spelling 55real bad news for ad blockers", URL: https://www.androidpolice.com/2020/12/09/chrome-debuts-manifest-v3-api-for-extensions-spelling-real-bad-news-for-ad-blockers/, Dec. 9, 2020, pp. 1-10.

(Continued)

*Primary Examiner* — Joseph P Hirl
*Assistant Examiner* — Hassan Saadoun
(74) *Attorney, Agent, or Firm* — Greenberg Traurig, LLP

(57) ABSTRACT

The disclosed computer-implemented method for enforcing strict network connectivity and storage access during online payments may include (i) determining that a webpage in a tab of a browser application executing on the computing device includes a payment page for an e-commerce website, (ii) based on determining that the webpage includes a payment page, providing formjacking attack protection by monitoring network connectivity and storage access by the browser tab, (iii) based on the formjacking attack protection, identifying a potentially malicious attempt to hijack information entered into at least one web form included in the payment page, and (iv) in response to identifying the potentially malicious attempt, preventing the potentially malicious attempt from hijacking the information entered into the at least one web form included in the payment page. Various other methods, systems, and computer-readable media are also disclosed.

20 Claims, 7 Drawing Sheets

(56) References Cited

OTHER PUBLICATIONS

Chrome Developers, "Content scripts", URL: https://developer.chrome.com/docs/extensions/mv3/content_scripts/, Sep. 17, 2012, pp. 1-16.
Gilbertson, David, "I'm harvesting credit card numbers and passwords from your site. Here's how.", URL: https://medium.com/hackernoon/im-harvesting-credit-card-numbers-and-passwords-from-your-site-here-s-how-9a8cb347c5b5, Jan. 6, 2018, pp. 1-14.
Segura, Jérôme, "Online credit card skimming increased by 26 percent in March", URL: https://blog.malwarebytes.com/cybercrime/2020/04/online-credit-card-skimming-increases-by-26-in-march/, Apr. 8, 2020, pp. 1-9.
Fortuna, Pedro, "The Growing Threat of Web Skimming Attacks in Retail", URL: https://www.mytotalretail.com/article/the-growing-threat-of-web-skimming-attacks-in-retail/, Feb. 3, 2021, pp. 1-8.
Grant-Muller, Georgina, "Web-Skimming attack affects 20,000 Customers on Home Improvement Site", URL: https://www.rapidspike.com/blog/web-skimming-attack-affects-20000-customers-on-home-improvement-site/, Apr. 30, 2020, pp. 1-8.

\* cited by examiner

SYSTEMS AND METHODS FOR ENFORCING STRICT NETWORK CONNECTIVITY AND STORAGE ACCESS DURING ONLINE PAYMENTS

BACKGROUND

Malicious attackers often attempt to hack websites (such as e-commerce websites) to gain unauthorized access to data on a computer system. For example, a malicious attacker may hack a merchant's e-commerce website in an attempt to obtain personal payment information for its customers. Once the e-commerce website is hacked, a malicious attacker may inject malicious code into a payment page associated with the e-commerce website. The malicious code may intercept and/or copy payment information of a customer during a checkout step (by, e.g., skimming credit card information from the customer during checkout). Examples of vulnerable e-commerce websites that may be susceptible to such an attack include (1) e-commerce websites that implement payment solutions where the merchant creates its own payment HyperText Markup Language (HTML) form and applies a payment gateway's Javascript code on top of the payment HTML form and (2) e-commerce websites that use the payment gateway's server Application Programming Interface (API).

So-called Magecart malicious attackers may specialize in cyberattacks on e-commerce websites that involve, for example, digital credit card theft by skimming online payment forms. These malicious e-commerce website attacks may bypass common website protection mechanisms such as content security policies (CSPs). In some cases, more advanced website protection mechanisms may implement domain-based protection in an attempt to thwart such attacks. Domain-based protection may evaluate a payment source domain and may restrict a web form from sending information to an unknown domain upon submission of the web form. Domain-based protection, however, may lack protection for situations where a supply chain of the e-commerce website (or, in some cases, a third-party payment mechanism) is hacked and compromised. In addition, or in the alternative, domain-based protection may not protect against situations where the malicious attacker collects and/or harvests payment and/or credit card information from a customer during checkout even before the customer submits payment.

The present disclosure, therefore, identifies and addresses a need for systems and methods for enforcing strict network connectivity and storage access during online payments to prevent such attacks.

SUMMARY

As will be described in greater detail below, the present disclosure describes various systems and methods for enforcing strict network connectivity and storage access during online payments to prevent the above-described attacks.

In one example, a method for enforcing strict network connectivity and storage access during online payments may include (i) determining that a webpage in a tab of a browser application executing on the computing device includes a payment page for an e-commerce website, (ii) based on determining that the webpage includes a payment page, providing formjacking attack protection by monitoring network connectivity and storage access by the browser tab, (iii) based on the formjacking attack protection, identifying a potentially malicious attempt to hijack information entered into at least one web form included in the payment page, and (iv) in response to identifying the potentially malicious attempt, preventing the potentially malicious attempt from hijacking the information entered into the at least one web form included in the payment page.

In an example embodiment, the information may be entered into the at least one web form included in the payment page comprises payment information of a customer.

In an example embodiment, the information entered into the at least one web form included in the payment page may include personal identification information of a customer.

In an example embodiment, the monitoring network connectivity may include monitoring outbound network connections associated with the browser tab.

In an example embodiment, identifying a potentially malicious attempt may include identifying an outbound network connection associated with the browser tab as risky, and preventing the potentially malicious attempt from hijacking the information may include blocking the outbound network connection associated with the browser tab.

In an example embodiment, monitoring network connectivity and storage access by the browser tab may include binding a respective event listener to each of one or more input fields included in the at least one web form included in the payment page.

In an example embodiment, the one or more input fields may include document object model (DOM) elements on the payment page. In some examples, the computer-implemented method may further include invoking an event listener module when an event is triggered for a document object model (DOM) element on the payment page.

In an example embodiment, the one or more input fields may allow a customer to input payment information that includes at least one payment account number.

In an example embodiment, monitoring storage access may include monitoring browser storage requests that originate from the browser tab.

In an example embodiment, identifying a potentially malicious attempt may include determining that the browser application is attempting to postpone a delivery of a payload from the browser tab.

In one embodiment, a system for enforcing strict network connectivity and storage access during online payments may include at least one physical processor and physical memory that includes computer-executable instructions that, when executed by the physical processor, cause the physical processor to (i) determine that a webpage in a tab of a browser application executing on the computing device includes a payment page for an e-commerce website, (ii) based on determining that the webpage includes a payment page, provide formjacking attack protection by monitoring network connectivity and storage access by the browser tab, (iii) based on the formjacking attack protection, identify a potentially malicious attempt to hijack information entered into at least one web form included in the payment page, and (iv) in response to identifying the potentially malicious attempt, prevent the potentially malicious attempt from hijacking the information entered into the at least one web form included in the payment page.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) determine that a webpage in a tab of a browser application executing on the computing device includes a payment page for an e-commerce website, (ii) based on determining that the webpage includes a payment page, provide formjacking attack protection by monitoring network connectivity and storage access by the browser tab, (iii) based on the formjacking attack protection, identify a potentially malicious attempt to hijack information entered into at least one web form included in the payment page, and (iv) in response to identifying the potentially malicious attempt, prevent the potentially malicious attempt from hijacking the information entered into the at least one web form included in the payment page.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
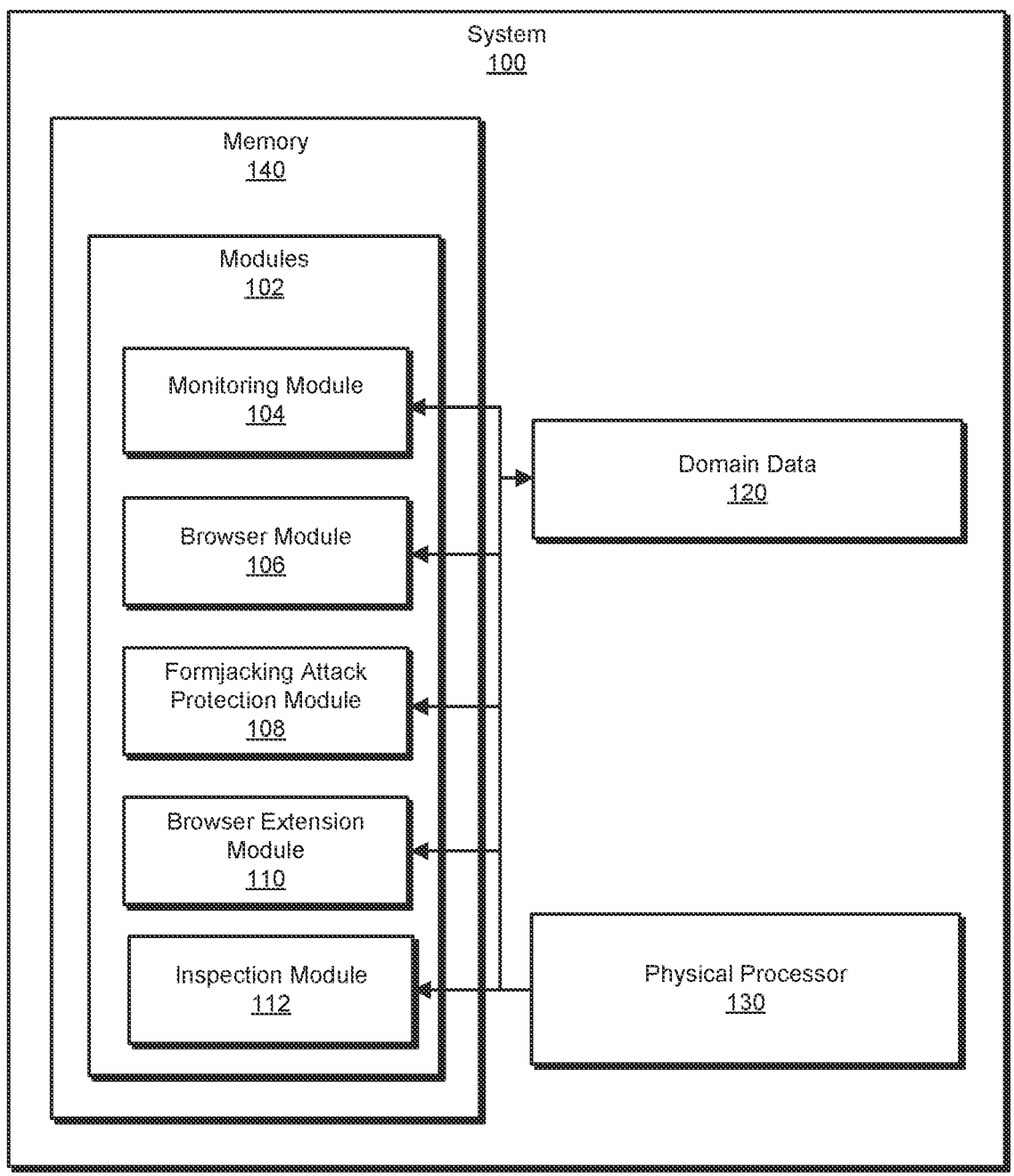
FIG. 1 is a block diagram of an example system for enforcing strict network connectivity and storage access during online payments.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for enforcing strict network connectivity and storage access during online payments. As will be explained in greater detail below, by providing, in a critical time window during which a customer may be entering payment information at checkout on an e-commerce website, one or more of a tight monitoring of network connections, event bindings (e.g., JavaScript event bindings), or APIs for use in storing information entered by the customer, the systems and methods described herein may protect a customer interacting with the e-commerce website from formjacking attacks. In addition, by monitoring network connectivity and storage access during online payments in this way, the systems and methods described herein may provide formjacking attack protection that may protect payment information entered into a web form for the e-commerce website from being provided or delivered to a malicious attacker.

In addition, the systems and methods described herein may improve the functioning of a computing device by detecting potential malicious activity by an attacker that may hijack or intercept personal and/or payment information for a user or customer interacting with a web form on a payment page for an e-commerce website. These systems and methods may also improve the field of cybersecurity and/or enterprise-level security by detecting and preventing cyberattacks that may involve skimming online payment forms (e.g., Magecart type attacks).

As will be explained in greater detail below, the formjacking attack protection techniques described herein may monitor network outbound connections of a browser tab. In some implementations, the formjacking attack protection may protect a customer from formjacking attacks by inspecting one or more outbound connections of a browser tab during an online payment step of the checkout process for the e-commerce website. The formjacking attack protection may identify a possible connection out of a browser tab as risky and, based on the identified risky connection, may block or otherwise not allow the connection out of the browser tab. An identified risky connection may include, but is not limited to, connecting to a non-trusted website or domain, or connecting to a domain that does not have a good reputation. In addition, or in the alternative, the formjacking attack protection may identify a possible connection out of a browser tab as not to be a risk (e.g., a non-risky connection) and, based on the identified non-risky connection, may not block or otherwise allow the connection out of the browser tab. An identified non-risky connection may include, but is not limited to, connecting to a main domain for the e-commerce website, connecting to subdomain for the e-commerce website, connecting to a trusted payment gateway provider domain, or connecting to a domain with a good reputation.

Formjacking attack protection may monitor browser storage to detect malicious scripts that may circumvent the monitoring of the outbound network connections of a browser tab by postponing the delivery of a payload. For example, a malicious script executing in the browser may store data to be transmitted from the browser tab of an e-commerce website to a payment fulfillment system. The malicious script may store payment account numbers entered by a customer in a web form on a checkout webpage of the e-commerce website. Monitoring the browser storage may detect the postponed delivery of a payload. Once detected, the formjacking attack protection may not allow the browser to deliver the payload using a network connection out of the browser tab.

In some situations, the monitoring of outbound network connections of a browser tab may result in one or more false positives. For example, the formjacking attack protection may identify a possible connection out of a browser tab as risky when the connection may not be risky. For example, the browser tab may attempt to connect to a domain. The formjacking attack protection may not have sufficient information about the domain and, in being cautious, may identify the connection as risky. Based on the identified risky connection, the formjacking attack protection may block or otherwise not allow the connection to the domain out of the browser tab.

In some implementations, to minimize the possible number of false positives, the formjacking attack protection may limit the monitoring or inspecting of outbound connections of a browser tab to those connections that are attempted when a customer is interacting with a payment form on the e-commerce website. In some implementations, formjacking attack protection may use bindings to events (e.g., event bindings) on a webpage to identify when the event is triggered on the webpage. An associated event listener for the event may invoke code (e.g., a JavaScript function) when the event is triggered for the associated document object model (DOM) element on the webpage. For example, a payment webpage of the e-commerce website may provide a payment form to a customer at checkout so that the customer may complete the purchase transaction. The payment form may include one or more input fields (e.g., HTML input fields). The input fields may allow the customer to input payment information that may include payment account numbers and other personal identification information of the customer. The input fields may allow the customer to input payment information that may include personal identification information of the customer that may include, but is not limited to, the name of the customer, a mailing address for the customer, an email address for the customer, a phone number for the customer, etc. The input fields may allow the customer to input payment information that may include payment account numbers that may include, but are not limited to, a credit card number, a debit card number, a bank account number, an expiration date, a card verification code, a card verification value, online payment system information, etc.

Formjacking attack protection may attach or bind an event listener to each input field on a payment form. In some implementations, the result of the binding of an event listener to each input field on a payment form may be the binding of event listeners to input fields that allow the customer to input personal identification information and the binding of event listeners to input fields that allow the customer to input payment account numbers. In these implementations, any event occurring on the payment webpage may invoke the associated event listener added to the event by the event binding. To further reduce the likelihood of false positives, in some implementations, the formjacking attack protection may attach or bind an event listener to just the input fields that allow the customer to input payment account numbers. In these implementations, events occurring on the payment webpage that are associated with the input fields that allow the customer to input payment account numbers may invoke the associated event listener added to the event by the event binding. In addition, or in the alternative, events occurring on the payment webpage associated with the input fields that that allow the customer to input personal identification information may not invoke an event listener because no event listeners are bound to these types of events, therefore, even further reducing the likelihood of false positives.

The formjacking attack protection monitoring of an e-commerce browser tab of a browser application may be implemented in a variety of ways. In some implementations, an extension to the browser application may implement the formjacking attack protection. In some implementations, the browser application itself may include or implement the formjacking attack protection.

The formjacking attack protection monitoring of an e-commerce browser tab may stop once a customer redirects the browser tab to a different webpage. In some cases, the webpage may be another webpage for the e-commerce website that is not a payment webpage. In some cases, the webpage may be a webpage for another website that is not an e-commerce website.

Figure 2:
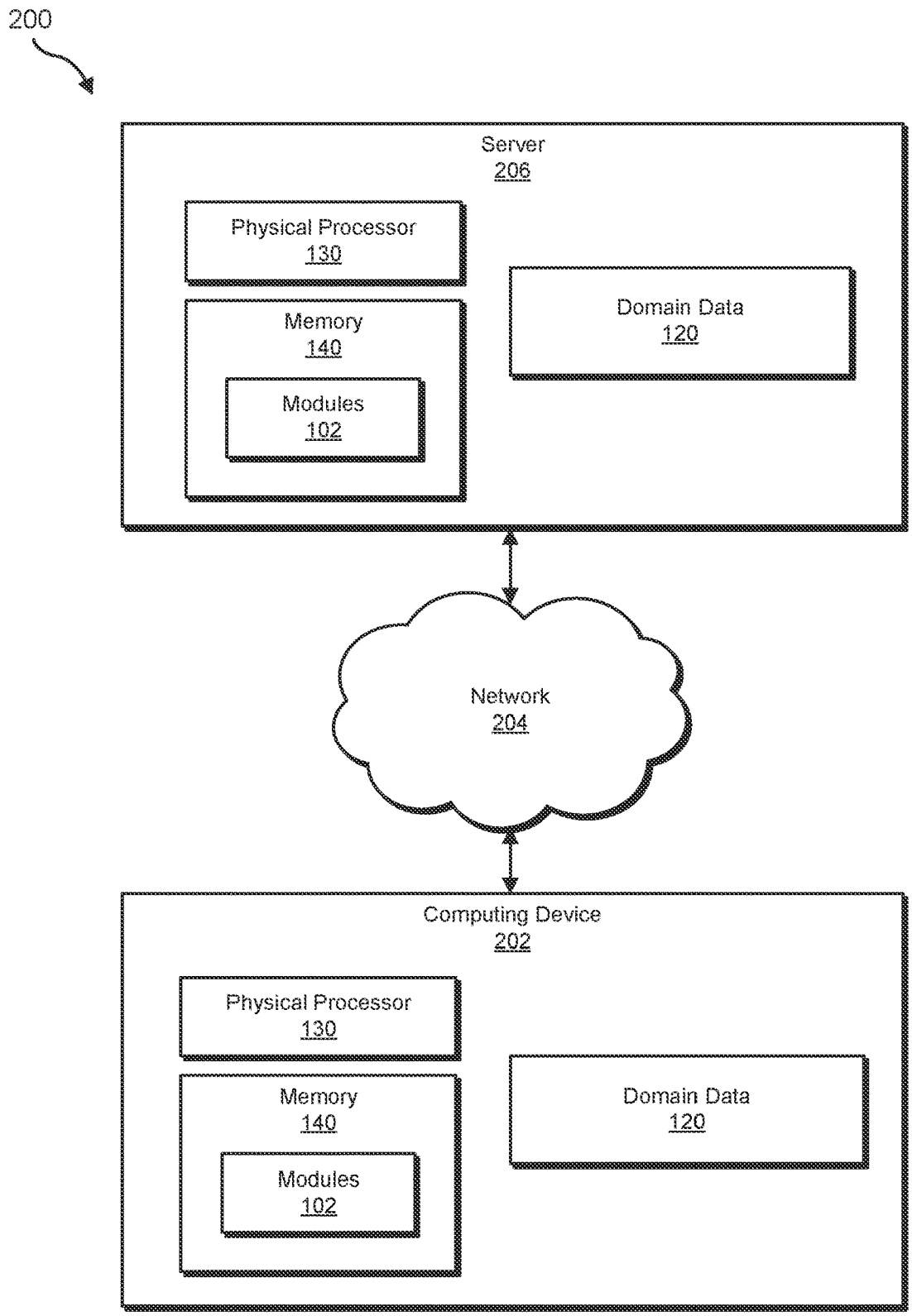
FIG. 2 is a block diagram of an additional example system for enforcing strict network connectivity and storage access during online payments.

The following will provide, with reference to FIGS. 1-2, detailed descriptions of example systems for enforcing strict network connectivity and storage access during online payments. Detailed descriptions of corresponding computer-implemented methods will also be provided in connection with FIG. 3. Detailed descriptions of formjacking attack protection will be provided in connection with FIG. 4 and FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for enforcing strict network connectivity and storage access during online payments. As illustrated in this figure, example system 100 may include one or more modules 102 for performing one or more tasks. As will be explained in greater detail below, modules 102 may include a monitoring module 104, a browser module 106, a formjacking attack protection module 108, a browser extension module 110, and an inspection module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enforcing strict network connectivity and storage access during online payments. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more data storage elements, such as domain data 120. Domain data 120 generally represents any type or form of memory storage that stores data associated with a reputation of a domain. In one example, the domain data 120 may store a confidence level for a domain. The greater a confidence level for a domain, the better the reputation for the domain. Domains with a low confidence level (e.g., a confidence level below a particular threshold) may be considered domains that do not have a good reputation. Formjacking protection may prevent a user from accessing or otherwise interacting with these identified domains (e.g., block access to the domains that do not have a good reputation) to protect the user from formjacking attacks. Examples of domain data may include, without limitation, a score associated with a domain representative of a reputation or confidence level of a domain.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to enforce strict network connectivity and storage access during online payments. For example, and as will be described in greater detail below, one or more of modules 102 may cause computing device 202 and/or server 206 to (i) determine that a webpage in a tab of a browser application executing on the computing device 202 includes a payment page for an e-commerce website, (ii) based on determining that the webpage includes a payment page, provide formjacking attack protection by monitoring network connectivity and storage access by the browser tab, (iii) based on the formjacking attack protection, identify a potentially malicious attempt to hijack information entered into at least one web form included in the payment page, and (iv) in response to identifying the potentially malicious attempt, prevent the potentially malicious attempt from hijacking the information entered into the at least one web form included in the payment page.

Computing device 202 generally represents any type or form of computing device capable of reading computer-executable instructions. Computing device 202 may be a smartphone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of determining that a webpage in a tab of a browser application executing on the computing device includes a payment page for an e-commerce website, providing formjacking attack protection by monitoring network connectivity and storage access by the browser tab, identifying a potentially malicious attempt to hijack information entered into at least one web form included in the payment page, and preventing the potentially malicious attempt from hijacking the information entered into the at least one web form included in the payment page. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Domain data 120 generally represents any type or form of memory storage that stores data associated with a reputation of a domain. In one example, the domain data 120 may store a confidence level for a domain. The greater a confidence level for a domain, the better the reputation for the domain. Domains with a low confidence level (e.g., a confidence level below a particular threshold) may be considered domains that do not have a good reputation. Formjacking protection may prevent a user from accessing or otherwise interacting with these identified domains (e.g., block access to the domains that do not have a good reputation) to protect the user from formjacking attacks. Examples of domain data may include, without limitation, a score associated with a domain representative of a reputation or confidence level of a domain. For example, a domain with a score of eight out of ten may indicate that 80% of users find the domain to have a good reputation. For example, a domain with a score of eight out of ten may indicate that 80% of users find the domain to have a good reputation.

Figure 3:
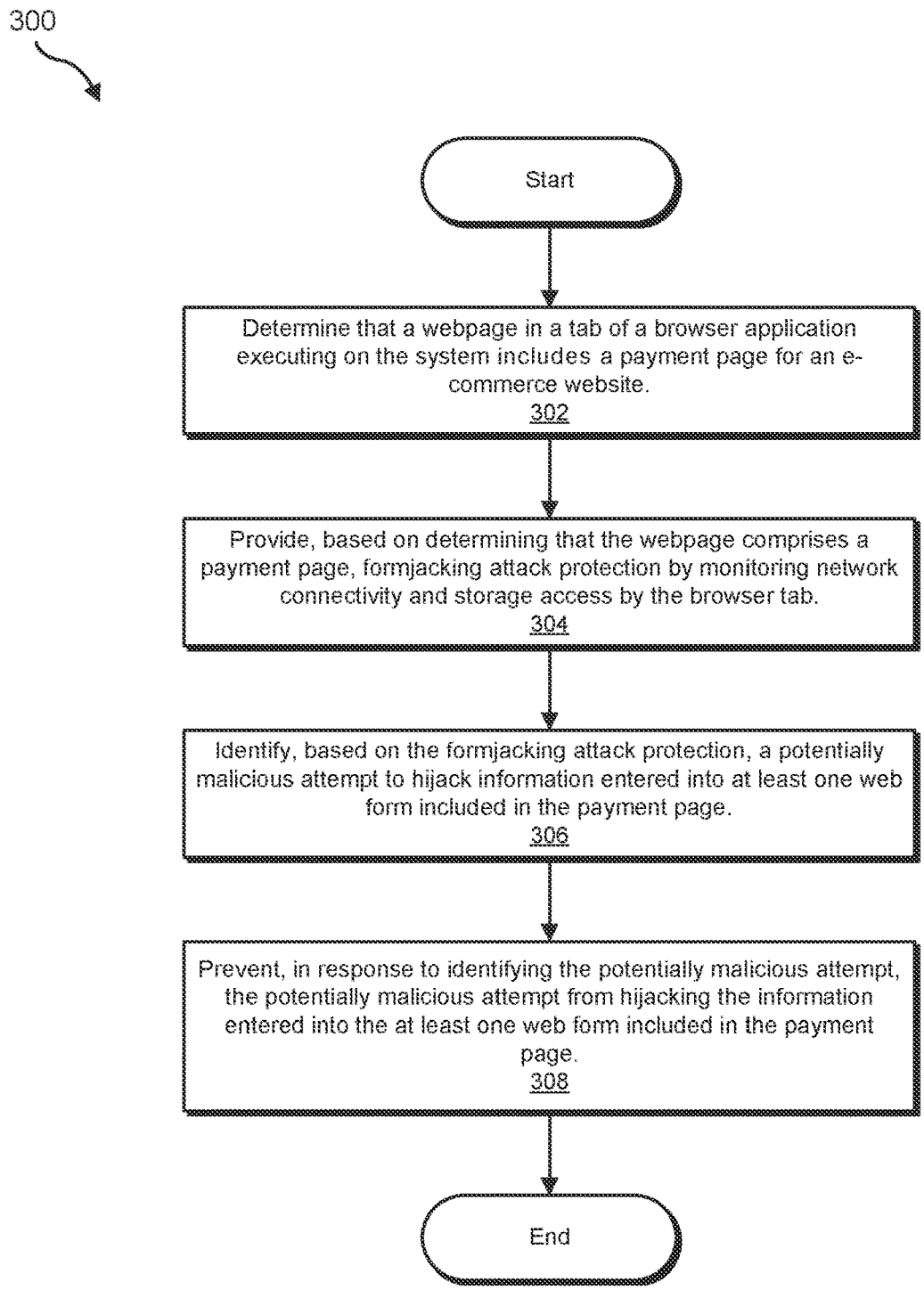
FIG. 3 is a flow diagram of an example method for enforcing strict network connectivity and storage access during online payments.

FIG. 3 is a flow diagram of an example computer-implemented method 300 for enforcing strict network connectivity and storage access during online payments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may determine that a webpage in a tab of a browser application executing on the system includes a payment page for an e-commerce website. For example, the browser extension module 110 may, as part of computing device 202 in FIG. 2, monitor an application executing in a browser application of the browser module 106 to determine that that a webpage in a tab of the browser application includes a payment page for an e-commerce website.

Figure 4:
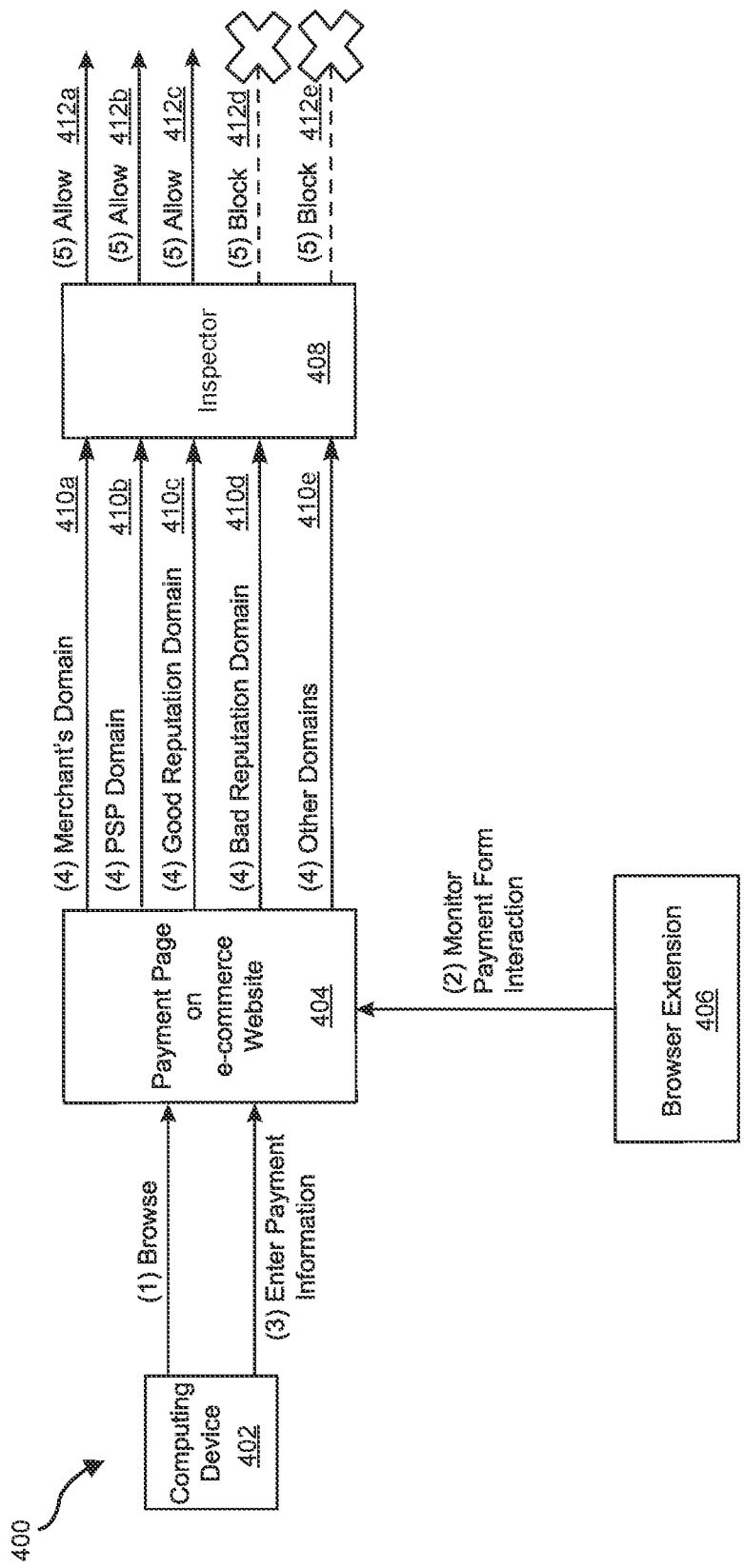
FIG. 4 is a block diagram of an example system for formjacking attack protection.

The term "payment page," as used herein, generally refers to a web page of an application running in a tab of a web browser that enables a user or customer to securely enter payment information and data for the purchase of items provided for sale by the application. Examples of a payment page include, without limitation, a checkout page for an e-commerce website. FIG. 4 provides an example of a payment page for an e-commerce website.

The term "e-commerce website," as used herein, generally refers to a website that allows e-commerce that includes the buying and selling of tangible goods, digital products, and/or services online (e.g., over an electronic medium such as the Internet). Additionally, or alternatively, an e-commerce website may implement the transfer of information and data that involves the electronic transfer of funds needed to complete a purchase transaction on the website. Examples of an e-commerce website include, without limitation, AMAZON®, Walmart®, eBay®, CRAIGSLIST®, and numerous other websites that allow the purchase and sale of goods and services online.

The systems described herein may perform step 302 in a variety of ways. In one example, referring to FIG. 1, the browser extension module 110 may implement and provide the formjacking attack protection browser extension 406 to the browser module 106 for interfacing with a browser application. In this implementation, the formjacking attack protection browser extension 406 may interface with the monitoring module 104 to determine when a user is interacting with a payment page of the e-commerce website.

In some implementations, the browser application itself may include or implement the formjacking attack protection. For example, the browser module 106 may provide a browser application for use by the user on the computing device 402 that includes and implements formjacking attack protection. In this implementation, the browser application may interface with the monitoring module 104 to determine when a user is interacting with a payment page of the e-commerce website.

As illustrated in FIG. 3, at step 304 one or more of the systems described herein may provide, based on determining that the webpage comprises a payment page, formjacking attack protection by monitoring network connectivity and storage access by the browser tab. For example, the inspection module 112 may, as part of computing device 202 in FIG. 2, monitor network connectivity and storage access by the browser tab. The inspection module 112 interface with the formjacking attack protection module 108 to provide formjacking protection.

The term "formjacking," as used herein, generally refers to the injecting of malicious code into a form page of a website for the purpose of hacking the website. The malicious code may hijack the functionality of the form page of the website to collect sensitive user information. For example, when the form page is a payment page of an e-commerce website, formjacking may steal credit card details and other sensitive payment information and data for a customer as they interact with a checkout web page for the e-commerce website. Examples of formjacking include, without limitation, the injecting of malicious JavaScript code into a form page of a website that collects information and data entered by a user while interacting with the form page where the malicious JavaScript code intercepts and collects the information and data entered by the user for malicious purposes.

The systems described herein may perform step 304 in a variety of ways. In one example, referring to FIG. 4, the formjacking attack protection inspector 408 may monitor interactions within and out of the browser tab for the payment page 404 by monitoring the integrity and reputation of outbound network connections and storage accesses associated with the browser tab. The systems may provide formjacking attack protection based on a determined integrity and reputation of an outbound network connection and/or storage access as determined by the formjacking attack protection module 108 accessing the domain data 120.

As described, the domain data 120 generally represents any type or form of memory storage that stores data associated with a reputation of a domain. In one example, the domain data 120 may store a confidence level for a domain that is associated with an integrity and reputation for the domain. For example, the greater a confidence level for a domain, the better the reputation for and integrity of the domain. Domains with a low confidence level (e.g., a confidence level below a particular threshold) may be considered domains that do not have a good reputation. Formjacking protection may prevent a user from accessing or otherwise interacting with these identified domains (e.g., block access to the domains that do not have a good reputation) to protect the user from formjacking attacks. In addition, or in the alternative, formjacking protection may allow a user to access or otherwise interact with domains with a high confidence level (e.g., a confidence level at or above a particular threshold) (e.g., allowing access to the domains that have a good reputation).

Examples of domain data may include, without limitation, a score associated with a domain representative of a reputation or confidence level of a domain. In some implementations, user feedback about the integrity of a domain may be gathered for use in determining the domain score. In some implementations, a system for enforcing strict network connectivity and storage access during online payments may score one or more domains based on information and data gathered by the provider of the system.

As illustrated in FIG. 3, at step 306 one or more of the systems described herein may identify, based on the formjacking attack protection, a potentially malicious attempt to hijack information entered into at least one web form included in the payment page. For example, the inspection module 112, and in particular the formjacking attack protection inspector 408, may, as part of computing device 202 in FIG. 2, identify, a potentially malicious attempt to hijack information entered into at least one web form included in the payment page.

The term "web form," as used herein, generally refers to a form on a web page of a website that allows a user to enter information and data that may be further provided to a server for processing. The web form may include, without limitation, one or more of checkboxes, radio buttons, or text fields. In some implementations, a payment page may include one or more web forms. A user may interact with a web form on a web page of an e-commerce website to provide information and data for completion of an online purchase. The information and data may include, without limitation, shipping information (e.g., recipient name and address) and/or payment information (e.g., purchaser's name, address, and payment information such as credit card number). For example, a payment page may include one or more web forms. Examples of a web form include, without limitation, a HyperText Markup Language (HTML) form on a web page.

The systems described herein may perform step 306 in a variety of ways. In one example, the formjacking attack protection may identify a potentially malicious attempt to hijack information entered into at least one web form (e.g., the web form 502) included in the payment page 404 by identifying a possible connection out of the browser tab as risky based on the formjacking attack protection inspector 408 monitoring one or more domains 410a-e that the payment page may attempt to access. The formjacking attack protection may identify a risky connection as an attempt of the payment page 404 to connect to a non-trusted website or domain that does not have a good reputation (e.g., bad reputation domain 410d). In another example, the formjacking attack protection may identify a risky connection as an attempt of the payment page to connect to a website or domain where little to no information about the website or domain is known by the formjacking attack protection module 108. For example, the domain data 120 may not include information about the type, identity, or reputation of the website or domain. In some implementations, in an abundance of caution, the inspection module 112 may notify the browser extension module 110 that the browser application should not allow the payment page 404 to interface with or otherwise access the other domains 410e. As such, the browser module 106 may block access by the e-commerce website to the other domains 410e (e.g., block 412e).

As illustrated in FIG. 3, at step 308 one or more of the systems described herein may prevent, in response to identifying the potentially malicious attempt, the potentially malicious attempt from hijacking the information entered into the at least one web form included in the payment page. For example, the formjacking attack protection module 108 may, as part of computing device 202 in FIG. 2, prevent the potentially malicious attempt from hijacking the information entered into the at least one web form included in the payment page.

The systems described herein may perform step 308 in a variety of ways. In one example, referring to FIG. 1, the inspection module 112 may notify the browser extension module 110 that the browser application should not allow the payment page 404 to interface with or otherwise access the bad reputation domain 410d and/or the other domains 410e. As such, the browser module 106 may block access by the e-commerce website to the bad reputation domain 410d (e.g., block 412d) and/or the other domains 410e (e.g., block 412e).

FIG. 4 is a block diagram of an example system 400 for formjacking attack protection. In some implementations, a user of a computing device 402 may access a web browser application. For example, referring to FIG. 1, the browser module 106 may provide the browser application. As described herein, example computing devices may include, but are not limited to, smartphones, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

In this example, a user may decide to do some online shopping by navigating to an e-commerce website in a browser tab of the browser application. The user may browse the e-commerce website, selecting goods and/or services for purchase. Once the shopping is completed, the user may navigate to a payment page 404 for the e-commerce website to enter the information and data needed to complete the online purchase of the goods and/or services. For example, the user may use the computing device 402 to enter personal identification information and/or payment information of the user into the one or more forms included on the payment page 404. The personal identification information of the user may include, but is not limited to, the name of the user, a mailing address for the user, an email address for the user, a phone number for the user, etc. The payment information of the user may include payment account numbers that may include, but are not limited to, a credit card number, a debit card number, a bank account number, an expiration date, a card verification code, a card verification value, online payment system information, etc. An example payment page will be described in more detail with reference to FIG. 5.

In some implementations, a formjacking attack protection browser extension may monitor interactions with a payment page. For example, a formjacking attack protection browser extension 406 may determine that the computing device 402 of the user has navigated to the payment page 404 of the e-commerce website. The formjacking attack protection browser extension 406 may then monitor interactions with and information and data input to and/or output from the payment page 404.

The formjacking attack protection monitoring of an e-commerce browser tab of a browser application may be implemented in a variety of ways. In some implementations, as shown in FIG. 4, an extension to the browser application may implement the formjacking attack protection. For example, referring to FIG. 1, the browser extension module 110 may implement and provide the formjacking attack protection browser extension 406 to the browser module 106 for interfacing with a browser application. In this implementation, the formjacking attack protection browser extension 406 may interface with the monitoring module 104 to determine when a user is interacting with a payment page of the e-commerce website. In some implementations, the browser application itself may include or implement the formjacking attack protection. For example, the browser module 106 may provide a browser application for use by the user on the computing device 402 that includes and implements formjacking attack protection. In this implementation, the browser application may interface with the monitoring module 104 to determine when a user is interacting with a payment page of the e-commerce website.

In some situations, a payment page may be compromised. For example, as described herein, a malicious attacker may inject malicious code into one or more forms included in the payment page 404 for the purpose of hacking the website by hijacking the functionality of the one or more forms to collect sensitive user information. For example, such formjacking may steal credit card details and other sensitive payment information and data for a user as they interact with the payment page by intercepting the sensitive information before it is sent to a payment fulfillment provider. In some cases, the malicious attacker may store the payment information and data for malicious use. In another example, the formjacking may steal personal information and data for a user as they interact with the payment page by intercepting the information and data and, in some cases, storing the information and data before it may be sent to a payment fulfillment provider. In some cases, the malicious attacker may maliciously use the personal information and data.

To implement formjacking attack protection, a system may include a formjacking attack protection inspector. For example, the system 400 may include a formjacking attack protection inspector 408. Referring to FIG. 1, the inspection module 112 may provide the formjacking attack protection inspector 408. The formjacking attack protection inspector 408 may monitor interactions within and out of the browser tab for the payment page 404.

In some implementations, a formjacking attack protection inspector may monitor the integrity and reputation of outbound network connections associated with a browser tab. For example, the formjacking attack protection inspector 408 may monitor the outbound network connections of a browser tab. Referring to FIG. 1, the inspection module 112 may interface with the formjacking attack protection module 108. The formjacking attack protection module 108 may interface with the domain data 120 to find information about a domain to determine the type and/or integrity of the domain. The formjacking attack protection inspector 408 may use this information to determine whether or not to allow the payment page 404 access to the domain. Doing so provides formjacking attack protection by not allowing the payment page 404 access to a domain that may potentially hack, hijack, or otherwise steal payment and/or personal information of a user.

In some implementations, the formjacking attack protection may protect a customer from formjacking attacks by inspecting one or more outbound connections of a browser tab during an online payment step of the checkout process for the e-commerce website. The formjacking attack protection may identify a possible connection out of a browser tab as risky and, based on the identified risky connection, may block or otherwise not allow the connection out of the browser tab. For example, the formjacking attack protection inspector 408 may monitor one or more domains 410a-e that the payment page may attempt to access. The formjacking attack protection inspector 408 may identify a risky connection as an attempt of the payment page 404 to connect to a non-trusted website or domain that does not have a good reputation (e.g., bad reputation domain 410d). The inspection module 112 may notify the browser extension module 110 that the browser application should not allow the payment page 404 to interface with or otherwise access the bad reputation domain 410d. As such, the browser module 106 may block access by the e-commerce website to the bad reputation domain 410d (e.g., block 412d).

In addition, or in the alternative, the formjacking attack protection inspector 408 may identify a risky connection as an attempt of the payment page 404 to connect to a website or domain where little to no information about the website or domain is known by the formjacking attack protection module 108. For example, the domain data 120 may not include information about the type, identity, or reputation of the website or domain. In some implementations, in an abundance of caution, the inspection module 112 may notify the browser extension module 110 that the browser application should not allow the payment page 404 to interface with or otherwise access the other domains 410e. As such, the browser module 106 may block access by the e-commerce website to the other domains 410e (e.g., block 412e).

In some implementations, the inspection module 112 may notify the browser extension module 110 that the browser application should first query the user for permission and/or confirmation to allow the payment page 404 to interface with or otherwise access the website or domain. As such, the browser module 106 may not block access by the e-commerce website to the other domains 410e unless confirmed by the user. In addition, the formjacking attack protection module 108 may store the input from the user about the access to the website or domain in the domain data 120. Such data may be stored for further use by the formjacking attack protection module 108 for determining future access to the website or domain.

In addition, or in the alternative, the formjacking attack protection may identify a possible connection out of a browser tab as not to be a risk (e.g., a non-risky connection) and based on the identified non-risky connection, may not block or otherwise may allow the connection out of the browser tab. For example, the formjacking attack protection inspector 408 may determine that the payment page 404 is attempting a connection to a domain on the e-commerce website (e.g., merchant's domain 410a). The inspector may allow the connection to the merchant's domain 410a (e.g., allow 412a). For example, the inspector 408 may determine that the payment page 404 is attempting a connection to a domain of a legitimate payment service provider (PSP) (e.g., PSP domain 410b). The inspector may allow the connection to the PSP domain 410b (e.g., allow 412b). For example, the formjacking attack protection inspector 408 may determine that the payment page 404 is attempting a connection to a domain with a good reputation (e.g., good reputation domain 410c). The inspector may allow the connection to the good reputation domain 410c (e.g., allow 412c).

Figure 5:
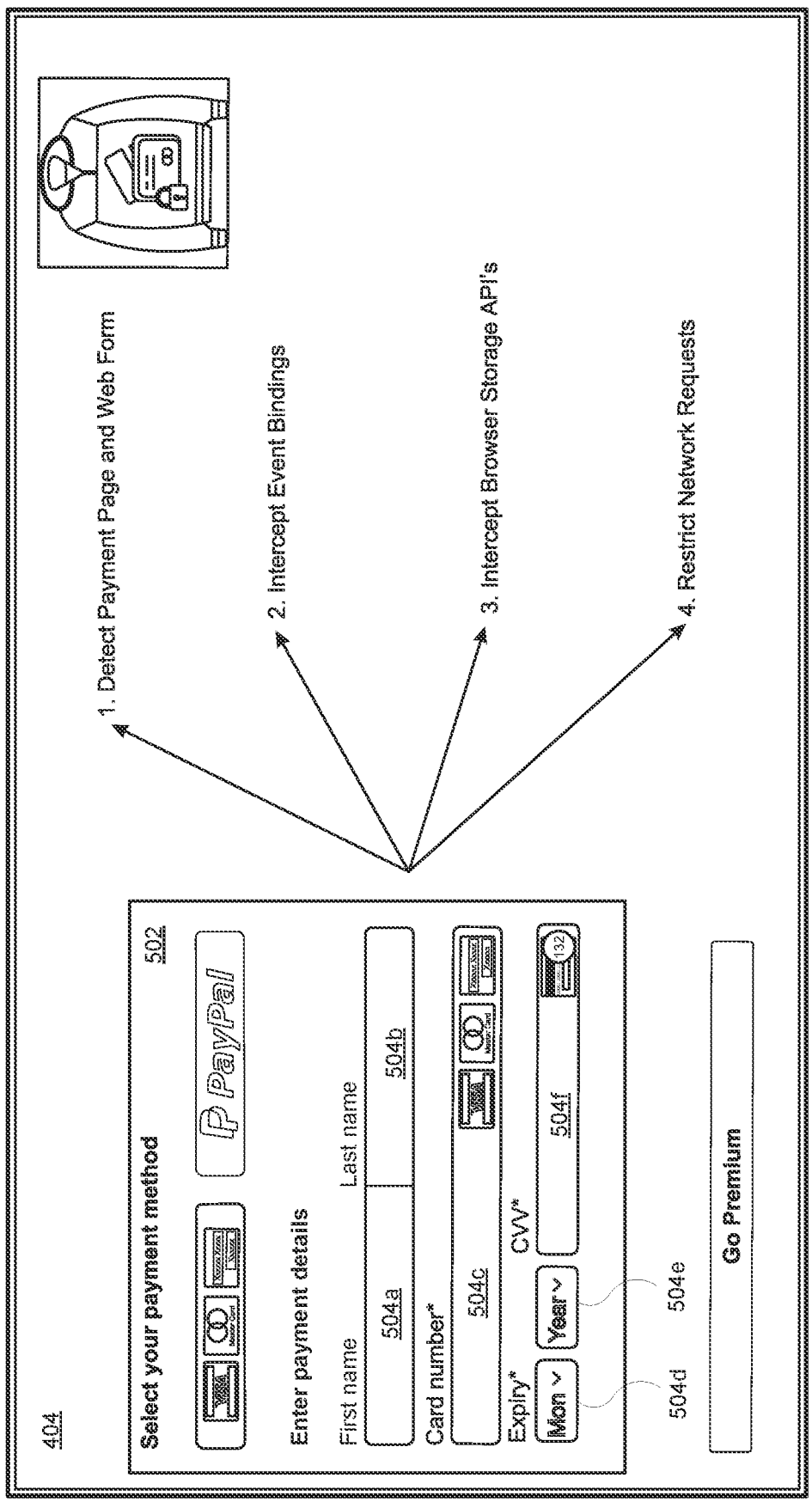
FIG. 5 is a block diagram of an example payment page of an e-commerce website that binds event listeners to document object model (DOM) elements on the payment page for use in formjacking attack protection.

FIG. 5 is a block diagram of an example payment page (e.g., the payment page 404) of an e-commerce website that binds event listeners to document object model (DOM) elements (e.g., DOMs 504a-c) on the payment page 404 for use in formjacking attack protection. The payment page 404 may include one or more web forms (e.g., web form 502 for use in entering payment information and data for a user). As described with reference to FIG. 4, for example, the system 400 may determine that the computing device 402 of the user has navigated to the payment page 404 of the e-commerce website. The system 400 may then monitor interactions with and information and data input to and/or output from the payment page 404.

In some implementations, the system 400 implementing formjacking attack protection may provide, in a critical time window during which the user may be entering payment information and/or otherwise interacting with the payment page 404 and specifically the web form 502, a tight monitoring of network connections as described herein by, for example, restricting any and/or all outbound network connection requests to monitoring and approval by the formjacking attack protection before the connection is allowed.

In addition, or in the alternative, the system 400 implementing formjacking attack protection may intercept, in a critical time window during which the user may be entering payment information and/or otherwise interacting with the payment page 404 and specifically the web form 502, any and/or all browser storage APIs for use in storing the information and data entered by the user into the web form 502. For example, the formjacking attack protection may monitor browser storage to detect malicious scripts that may circumvent the monitoring of the outbound network connections of a browser tab by postponing the delivery of a payload. For example, a malicious script executing in a browser application may store data to be transmitted from the browser tab displaying the payment page 404 to a payment fulfillment system. The malicious script may store payment account numbers entered by the user in the web form 502 of the payment page 404. Monitoring the browser storage may detect the postponed delivery of a payload.

Once detected, the formjacking attack protection may not allow the browser to deliver the payload using an outbound network connection.

In addition, or in the alternative, the system 400 implementing formjacking attack protection may intercept, in a critical time window during which the user may be entering payment information and/or otherwise interacting with the payment page 404 and specifically the web form 502, any event bindings (e.g., JavaScript event bindings) to any and/or all of the document object model (DOM) elements (e.g., DOM elements 504a-f) in the web form 502 to identify malicious code that may attempt to intercept and/or copy payment information of the user as entered into the web form 502. For example, the formjacking attack protection may bind event listeners to each DOM element 504a-f. In some cases, a vulnerable e-commerce website may be an e-commerce website that implements payment solutions where the merchant creates its own payment HyperText Markup Language (HTML) form and applies a payment gateway's Javascript code on top the payment HTML form. In some cases, a vulnerable e-commerce website may be an e-commerce website that uses the payment gateway's server Application Programming Interface (API)

In some implementations, formjacking attack protection may monitor browser storage to detect malicious scripts that may circumvent the monitoring of the outbound network connections of a browser tab by postponing the delivery of a payload. For example, a malicious script executing in the browser may store data to be transmitted from the browser tab of an e-commerce website to a payment fulfillment system. The malicious script may store payment account numbers entered by a customer in a web form on a checkout webpage of the e-commerce website. Monitoring the browser storage may detect the postponed delivery of a payload. Once detected, the formjacking attack protection may not allow the browser to deliver the payload using a network connection out of the browser tab.

As detailed above, enforcing strict network connectivity and storage access during online payments may advantageously provide, in a critical time window during which a user or customer may be entering payment information at checkout on an e-commerce website, one or more of a tight monitoring of network connections, a tight monitoring of event bindings (e.g., JavaScript event bindings), or a tight monitoring of browser application APIs for use in storing information entered by the customer. The tight monitoring may identify the hijacking of sensitive information of the user by a malicious attacker that may introduce malicious code or scripts into payment pages (and in particular web forms) of an e-commerce website. Identifying such hacking of an e-commerce website may protect the sensitive information and data of the user from formjacking attacks. This formjacking attack protection may protect payment information entered into a web form for the e-commerce website from being provided or delivered to the malicious attacker.

Figure 6:
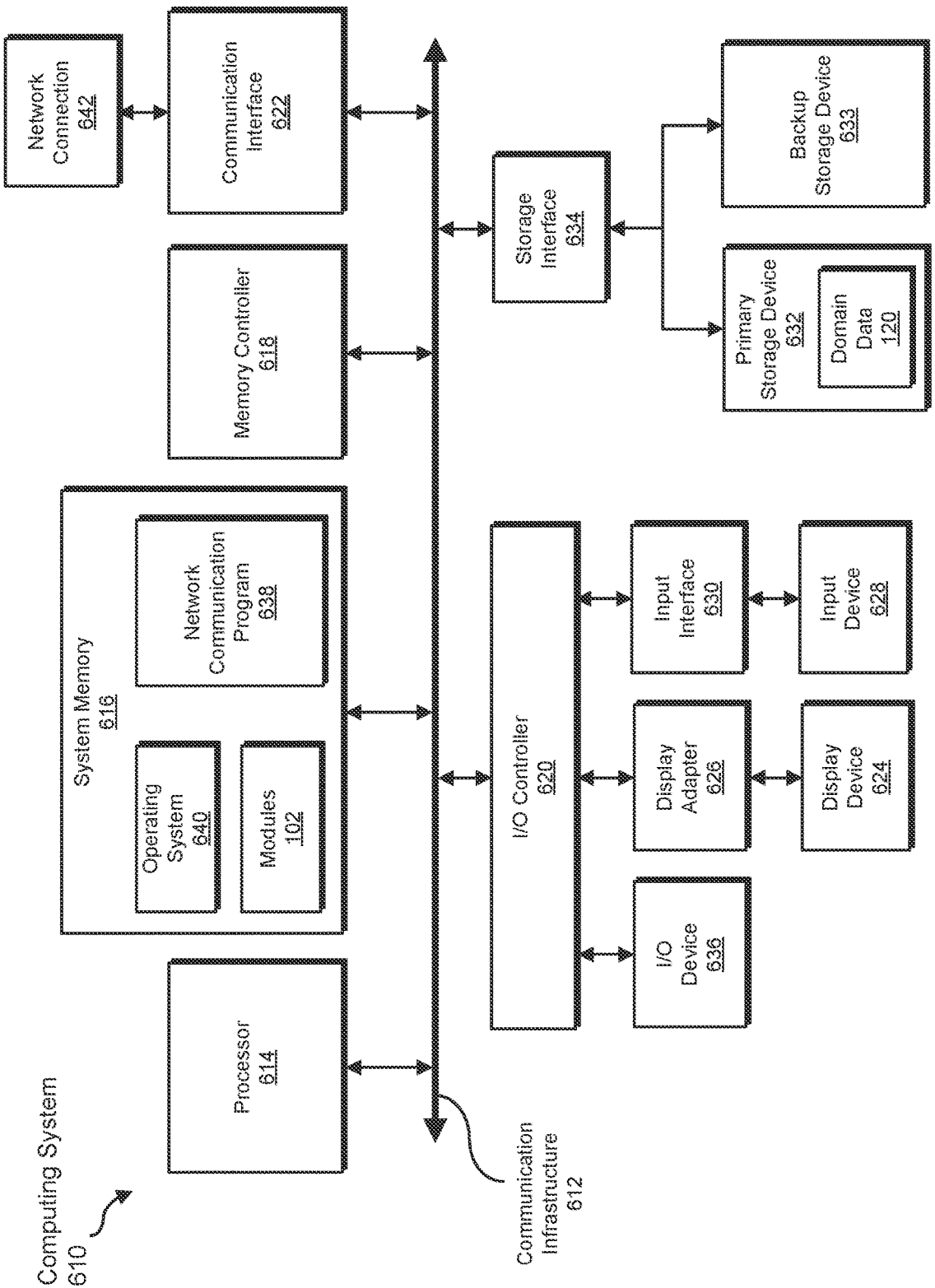
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, domain data 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
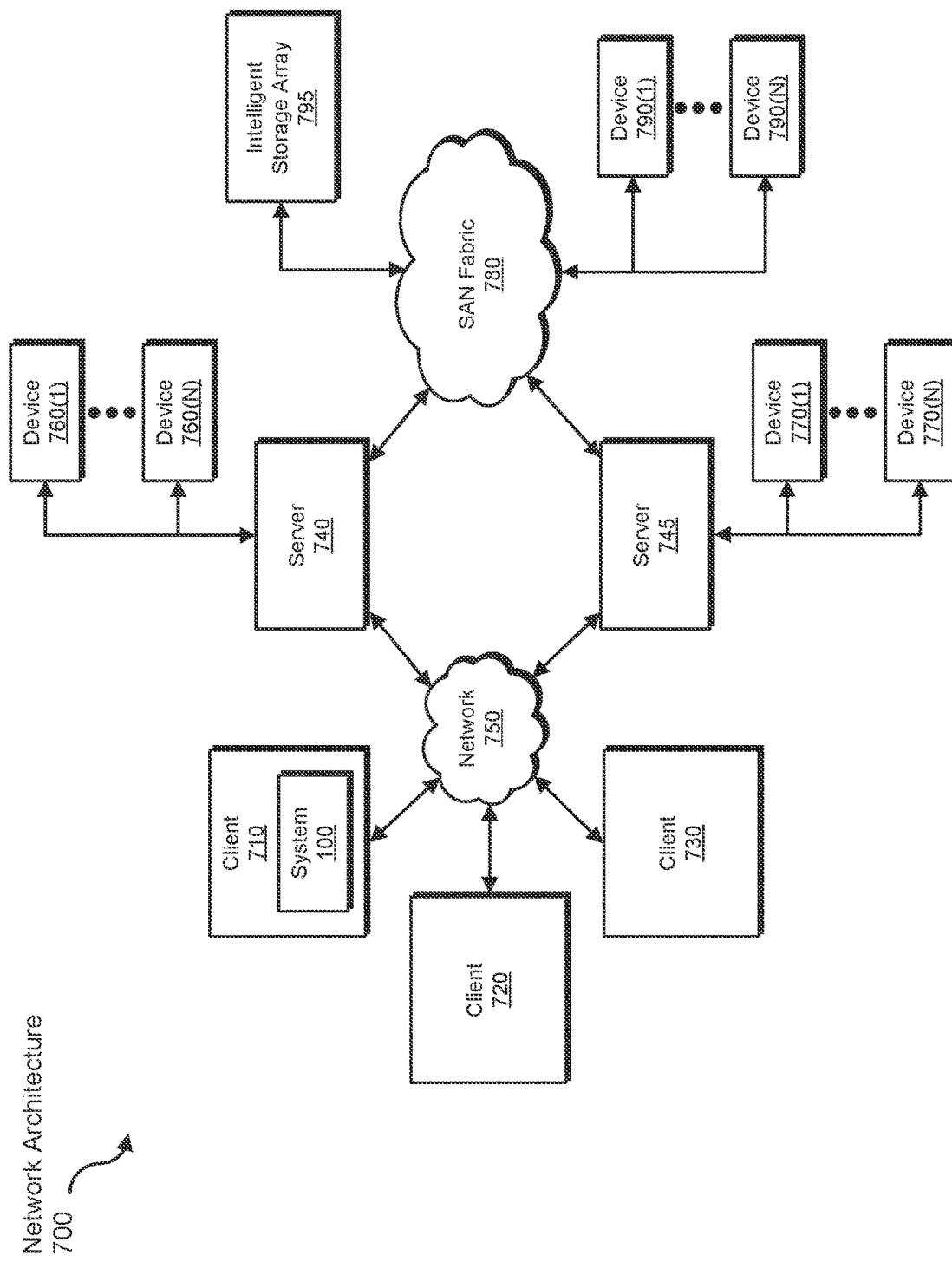
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for enforcing strict network connectivity and storage access during online payments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data (e.g., data for domains 410a-e) to be transformed, transform the data for the domains 410a-e to determine the reputation and/or integrity of a domain, output a result of the transformation to the payment page 404, use the result of the transformation to determine whether or not to allow a connection and/or access to a domain, and store the result of the transformation to the payment page 404. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing strict network connectivity and storage access during online payments, at least a portion of the method being performed by a computing device comprising at least one processor, the method comprising:
   determining, by a computing device, that a webpage in a tab of a browser application executing on the computing device comprises a payment page for an e-commerce website;
   providing, by the computing device and based on determining that the webpage comprises a payment page, formjacking attack protection by monitoring network connectivity and storage access by the browser tab;
   identifying, by the computing device and based on the formjacking attack protection, a potentially malicious attempt to hijack information entered into at least one web form included in the payment page by:
      detecting a browser storage request for storing a payload including the information entered into the at least one web form; and
      detecting an attempted postponed delivery of the payload; and
   preventing, by the computing device and in response to identifying the potentially malicious attempt, the potentially malicious attempt from hijacking the information entered into the at least one web form included in the payment page.

2. The computer-implemented method of claim 1, wherein the information entered into the at least one web form included in the payment page comprises payment information of a customer.

3. The computer-implemented method of claim 1, wherein the information entered into the at least one web form included in the payment page comprises personal identification information of a customer.

4. The computer-implemented method of claim 1, wherein monitoring network connectivity comprises monitoring outbound network connections associated with the browser tab.

5. The computer-implemented method of claim 4, wherein:
   identifying a potentially malicious attempt comprises identifying an outbound network connection associated with the browser tab as risky; and
   preventing the potentially malicious attempt from hijacking the information comprises blocking the outbound network connection associated with the browser tab.

6. The computer-implemented method of claim 1, wherein monitoring network connectivity and storage access by the browser tab comprises binding a respective event listener to each of one or more input fields included in the at least one web form included in the payment page.

7. The computer-implemented method of claim 6, wherein:
   the one or more input fields comprise document object model (DOM) elements on the payment page; and
   the computer-implemented method further comprises invoking an event listener module when an event is triggered for a document object model (DOM) element on the payment page.

8. The computer-implemented method of claim 6, wherein the one or more input fields allow a customer to input payment information that includes at least one payment account number.

9. The computer-implemented method of claim 1, wherein monitoring storage access comprises monitoring browser storage requests that originate from the browser tab.

10. The computer-implemented method of claim 1, wherein preventing the potentially malicious attempt from hijacking the information comprises blocking the postponed delivery of the payload from the browser tab.

11. A system for enforcing strict network connectivity and storage access during online payments, the system comprising:
    at least one physical processor; and
    physical memory comprising computer-executable instructions that, when executed by the physical processor, cause the physical processor to:
       determine that a webpage in a tab of a browser application executing on the system comprises a payment page for an e-commerce website;
       provide, based on determining that the webpage comprises a payment page, formjacking attack protection by monitoring network connectivity and storage access by the browser tab;
       identify, based on the formjacking attack protection, a potentially malicious attempt to hijack information entered into at least one web form included in the payment page by:
          detecting a browser storage request for storing a payload including the information entered into the at least one web form; and
          detecting an attempted postponed delivery of the payload; and
       prevent, in response to identifying the potentially malicious attempt, the potentially malicious attempt from hijacking the information entered into the at least one web form included in the payment page.

12. The system of claim 11, wherein the information entered into the at least one web form included in the payment page comprises payment information of a customer.

13. The system of claim 11, wherein the information entered into the at least one web form included in the payment page comprises personal identification information of a customer.

14. The system of claim 11, wherein monitoring network connectivity comprises monitoring outbound network connections associated with the browser tab.

15. The system of claim 14, wherein:
identifying the potentially malicious attempt comprises identifying an outbound network connection associated with the browser tab as risky; and
preventing the potentially malicious attempt from hijacking the information comprises blocking the outbound network connection associated with the browser tab.

16. The system of claim 11, wherein monitoring network connectivity and storage access by the browser tab comprises binding a respective event listener to each of one or more input fields included in the at least one web form included in the payment page.

17. The system of claim 16, wherein:
the one or more input fields comprise document object model (DOM) elements on the payment page; and
the computer-executable instructions that, when executed by the physical processor, further cause the physical processor to invoke an event listener module when an event is triggered for a document object model (DOM) element on the payment page.

18. The system of claim 16, wherein the one or more input fields allow a customer to input payment information that includes at least one payment account number.

19. The system of claim 11, wherein:
monitoring storage access comprises monitoring browser storage requests that originate from the browser tab; and
identifying the potentially malicious attempt comprises determining that the browser application is attempting to postpone a delivery of a payload from the browser tab.

20. A non-transitory computer-readable medium comprising one or more computer-executable instructions that, when executed by at least one processor of a computing device, cause the computing device to:
determine that a webpage in a tab of a browser application executing on the computing device comprises a payment page for an e-commerce website;
provide, based on determining that the webpage comprises a payment page, formjacking attack protection by monitoring network connectivity and storage access by the browser tab;
identify, based on the formjacking attack protection, a potentially malicious attempt to hijack information entered into at least one web form included in the payment page; and by:
detecting a browser storage request for storing a payload including the information entered into the at least one web form; and
detecting an attempted postponed delivery of the payload; and
prevent, in response to identifying the potentially malicious attempt, the potentially malicious attempt from hijacking the information entered into the at least one web form included in the payment page.

\* \* \* \* \*